United States Patent
Taniguchi et al.

(10) Patent No.: US 10,162,323 B2
(45) Date of Patent: Dec. 25, 2018

(54) COMPONENT MOUNTING SYSTEM AND COMPONENT MOUNTING METHOD

(71) Applicant: Panasonic Intellectual Property Management Co., Ltd., Osaka (JP)

(72) Inventors: Masahiro Taniguchi, Yamanashi (JP);
Masafumi Inoue, Yamanashi (JP);
Satoshi Furuichi, Yamanashi (JP);
Masahiro Kihara, Yamanashi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 79 days.

(21) Appl. No.: 15/386,513

(22) Filed: Dec. 21, 2016

(65) Prior Publication Data
US 2017/0227939 A1    Aug. 10, 2017

(30) Foreign Application Priority Data

Feb. 4, 2016    (JP) .................................. 2016-019860

(51) Int. Cl.
*G05B 19/042*    (2006.01)
*G01M 1/30*    (2006.01)
(Continued)

(52) U.S. Cl.
CPC ............. *G05B 19/042* (2013.01); *G01M 1/30* (2013.01); *G05B 19/404* (2013.01);
(Continued)

(58) Field of Classification Search
CPC ............. G05B 19/042; G05B 19/4083; G05B 19/404; G05B 2219/36195;
(Continued)

(56) References Cited

U.S. PATENT DOCUMENTS

| | | | | | |
|---|---|---|---|---|---|
| 4,776,088 | A | * | 10/1988 | Biggs | H05K 13/0413 29/407.1 |
| 5,564,183 | A | * | 10/1996 | Satou | B23K 31/12 29/593 |

(Continued)

FOREIGN PATENT DOCUMENTS

JP    2014-216353 A    11/2014

*Primary Examiner* — Ramesh B Patel
(74) *Attorney, Agent, or Firm* — Pearne & Gordon LLP

(57) ABSTRACT

In a component mounting system having an inspection device performing a mounting inspection after component mounting, a correction value for correcting a mounting program is calculated based on board inspection information including fed-back component position deviation information, a component is mounted on a board in accordance with the mounting program corrected based on the calculated correction value, and a "present value" based on most recent board inspection information and a "pre-correction evaluation value" are displayed together on an evaluation value display screen as evaluation values representing accuracy at a time of the mounting based on the board inspection information during this component mounting work, the "pre-correction evaluation value" being calculated based on a temporary position deviation amount pertaining to a case where it is assumed that no correction based on the calculated correction value has been performed.

7 Claims, 9 Drawing Sheets

(51) Int. Cl.
*G05B 19/404* (2006.01)
*G05B 19/408* (2006.01)

(52) U.S. Cl.
CPC .......... *G05B 19/4083* (2013.01); *G05B 2219/25068* (2013.01); *G05B 2219/32192* (2013.01); *G05B 2219/36043* (2013.01); *G05B 2219/36069* (2013.01); *G05B 2219/36195* (2013.01); *Y02P 90/22* (2015.11)

(58) Field of Classification Search
CPC ........... G05B 2219/36069; G05B 2219/36043; G05B 2219/32192; G05B 2219/25068; G01M 1/30; Y02P 90/22
See application file for complete search history.

(56) References Cited

U.S. PATENT DOCUMENTS

| | | | | |
|---|---|---|---|---|
| 5,822,449 A * | 10/1998 | Kobayashi | ....... | G01N 21/95607 382/141 |
| 6,457,232 B1 * | 10/2002 | Isogai | ................ | H05K 13/0413 29/833 |
| 6,496,957 B1 * | 12/2002 | Kumagai | ................ | G06F 17/50 716/112 |
| 6,606,788 B1 * | 8/2003 | Morimoto | .............. | H05K 13/08 29/823 |
| 6,661,931 B1 * | 12/2003 | Kawada | .................... | G06T 7/33 382/276 |
| 6,964,093 B2 * | 11/2005 | Mochida | .............. | H05K 3/1216 228/180.22 |
| 6,999,835 B2 * | 2/2006 | Kodama | ............ | G05B 19/4065 700/108 |
| 7,809,461 B2 * | 10/2010 | Noda | ..................... | H05K 13/08 156/273.9 |
| 7,869,059 B2 * | 1/2011 | Nozaki | ..................... | G06F 17/50 356/301 |
| 7,890,204 B2 * | 2/2011 | Maenishi | ............... | H05K 13/08 700/121 |
| 8,321,157 B2 * | 11/2012 | Omori | ................ | G01R 31/2849 324/537 |
| 8,371,027 B2 * | 2/2013 | Inoue | ................... | H05K 3/3484 228/105 |
| 8,689,435 B2 * | 4/2014 | Nishida | ............. | H05K 13/0452 29/729 |
| 2001/0012107 A1 * | 8/2001 | Toh | ................... | G01N 21/95684 356/601 |
| 2002/0014001 A1 * | 2/2002 | Isogai | ................ | H05K 13/0069 29/739 |
| 2002/0014732 A1 * | 2/2002 | Isogai | ................ | H05K 13/0069 269/21 |
| 2002/0083570 A1 * | 7/2002 | Inoue | ................ | H05K 13/0465 29/428 |
| 2004/0073322 A1 * | 4/2004 | Maenishi | ........... | H05K 13/0452 700/28 |
| 2004/0153868 A1 * | 8/2004 | Nonaka | ............ | G05B 19/41805 714/47.2 |
| 2011/0302776 A1 * | 12/2011 | Kato | ................... | H05K 13/0452 29/829 |
| 2013/0057676 A1 * | 3/2013 | Ikeda | ................... | H05K 13/0417 348/87 |

* cited by examiner $Cp = T/6\sigma$ ········ (1)
$k = |M|/(T/2)$ ······ (2)
$Cpk = (1-k) \cdot Cp$ ····· (3)

COMPONENT MOUNTING SYSTEM AND COMPONENT MOUNTING METHOD

BACKGROUND

1. Technical Field

The present disclosure relates to a component mounting system and a component mounting method for component mounting on a board.

2. Description of the Related Art

A plurality of devices for mounting are connected to constitute a component mounting system for mounting board manufacturing based on component mounting on a board, examples of the devices for mounting including a solder printing device that prints a solder for component bonding on the board and a component mounting device that mounts a component on the board after the solder printing. After the component mounting by the component mounting device, the board becomes a target of an inspection by an inspection device and a component mounting state is inspected by optical inspection or the like. Regarding the component mounting system that has the above-described configuration, a system has been proposed in the related art that creates and feeds back correction information for correction of a mounting program of a component mounting device based on, for example, position deviation information regarding a component obtained by board inspection following component mounting (for example, refer to PTL 1).

CITATION LIST

Patent Literature

PTL 1: Japanese Patent Unexamined Publication No. 2014-216353

SUMMARY

An object of the present disclosure is to provide a component mounting system and a component mounting method providing a good grasp of an inspection result feedback-based correction effect and enabling the confirmation of a facility failure situation.

A component mounting system according to the present disclosure includes a correction value calculation unit calculating a correction value for correcting a mounting program based on board inspection information including at least position deviation information regarding a component mounted on a board, a component mounting unit mounting the component on the board in accordance with the mounting program corrected based on the correction value calculated by the correction value calculation unit, an evaluation value calculation unit calculating evaluation values based on the board inspection information, the evaluation values representing accuracy at a time of the mounting by the component mounting unit, and a display unit displaying the evaluation values calculated by the evaluation value calculation unit, in which the evaluation value calculation unit calculates a specific-point-in-time evaluation value and a pre-correction evaluation value as the evaluation values, the specific-point-in-time evaluation value being an evaluation value calculated based on the board inspection information at a specific point in time and the pre-correction evaluation value being calculated based on information obtained by the correction value used during the mounting by the component mounting unit on the board as a target of the board inspection information at the specific point in time being subtracted from the board inspection information at the specific point in time, and the display unit displays the specific-point-in-time evaluation value and the pre-correction evaluation value.

A component mounting method according to the present disclosure includes calculating a correction value for correcting a mounting program based on board inspection information including at least position deviation information regarding a component mounted on a board, mounting the component on the board in accordance with the mounting program corrected based on the calculated correction value, calculating evaluation values based on the board inspection information, the evaluation values representing accuracy at a time of the mounting, and displaying the calculated evaluation values, in which the evaluation values are a specific-point-in-time evaluation value and a pre-correction evaluation value, the specific-point-in-time evaluation value being an evaluation value calculated based on the board inspection information at a specific point in time and the pre-correction evaluation value being calculated based on information obtained by the correction value used during the mounting on the board as a target of the board inspection information at the specific point in time being subtracted from the board inspection information at the specific point in time, and the specific-point-in-time evaluation value and the pre-correction evaluation value are displayed.

According to the present disclosure, a good grasp of an inspection result feedback-based correction effect can be provided and a facility failure situation can be confirmed.

DETAILED DESCRIPTION

A problem related to the system according to the related art will be briefly described before an exemplary embodiment of the present disclosure is described. The related art including the example disclosed in the above-described patent literature has the following disadvantages. Although a high level of component mounting accuracy is maintained based on post-component mounting inspection result feedback to the mounting program, only final component mounting information such as the position deviation information cannot be confirmed from a post-mounting inspection result, and thus it cannot be confirmed how much the fed-back correction information represents the final component mounting information and an effect of the fed-back correction information cannot be grasped with clarity. In other words, a failure of a facility such as the component mounting device is not conspicuous, because of inspection result feedback-based correction, even when the failure actually occurs, and thus it cannot be determined whether maintenance for correcting the facility failure is actually required or not.

Figure 1:
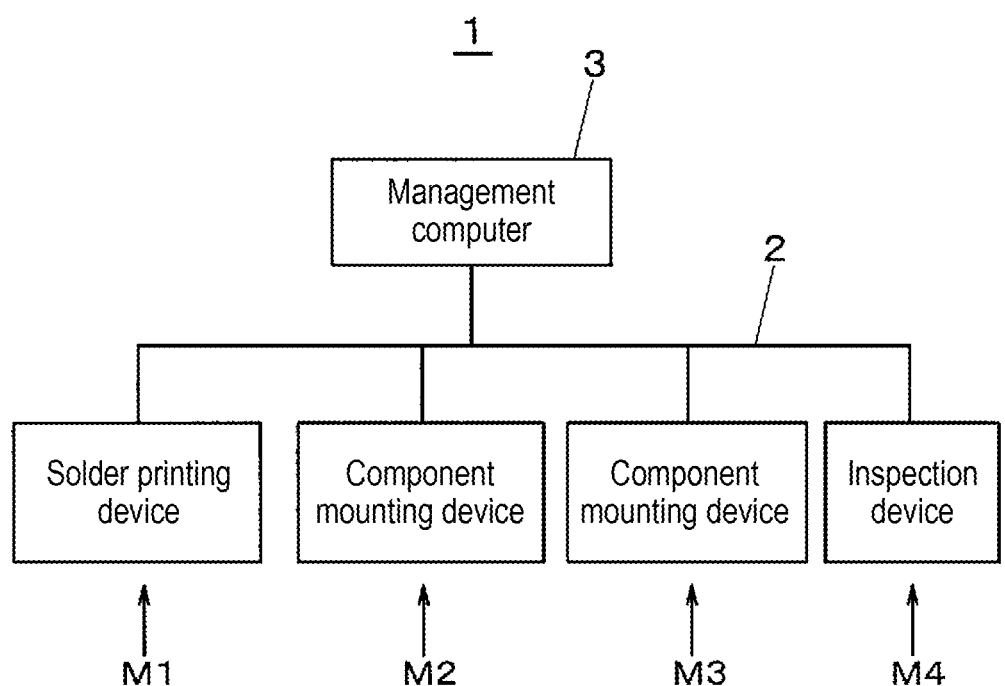
FIG. 1 is an explanatory diagram illustrating a configuration of a component mounting system according to an exemplary embodiment of the present disclosure.

Hereinafter, the exemplary embodiment of the present disclosure will be described with reference to accompanying drawings. A configuration of component mounting system 1 to which the present exemplary embodiment is applied will be described first with reference to FIG. 1. Component mounting system 1, which has a mounting board manufacturing function based on electronic component mounting on a board, has solder printing device M1, component mounting devices M2 and M3, and inspection device M4. These devices are connected to management computer 3 via communication network 2.

Solder printing device M1 screen-prints a solder for component bonding on the board that is a mounting target. Component mounting devices M2 and M3 perform a component mounting work by using component mounting unit 10 (refer to FIG. 2), the component mounting work being to transfer and place a component taken out from a component supply unit to and on the board printed with the solder for component bonding. Inspection device M4 inspects a component mounting state regarding the board following the mounting of the component by component mounting devices M2 and M3 and detects a state of position deviation from a correct mounting position. Management computer 3 has not only a line management function but also a function for calculating an evaluation value representing accuracy at a time of the mounting by component mounting devices M2 and M3 based on board inspection information acquired from inspection device M4.

Figure 2:
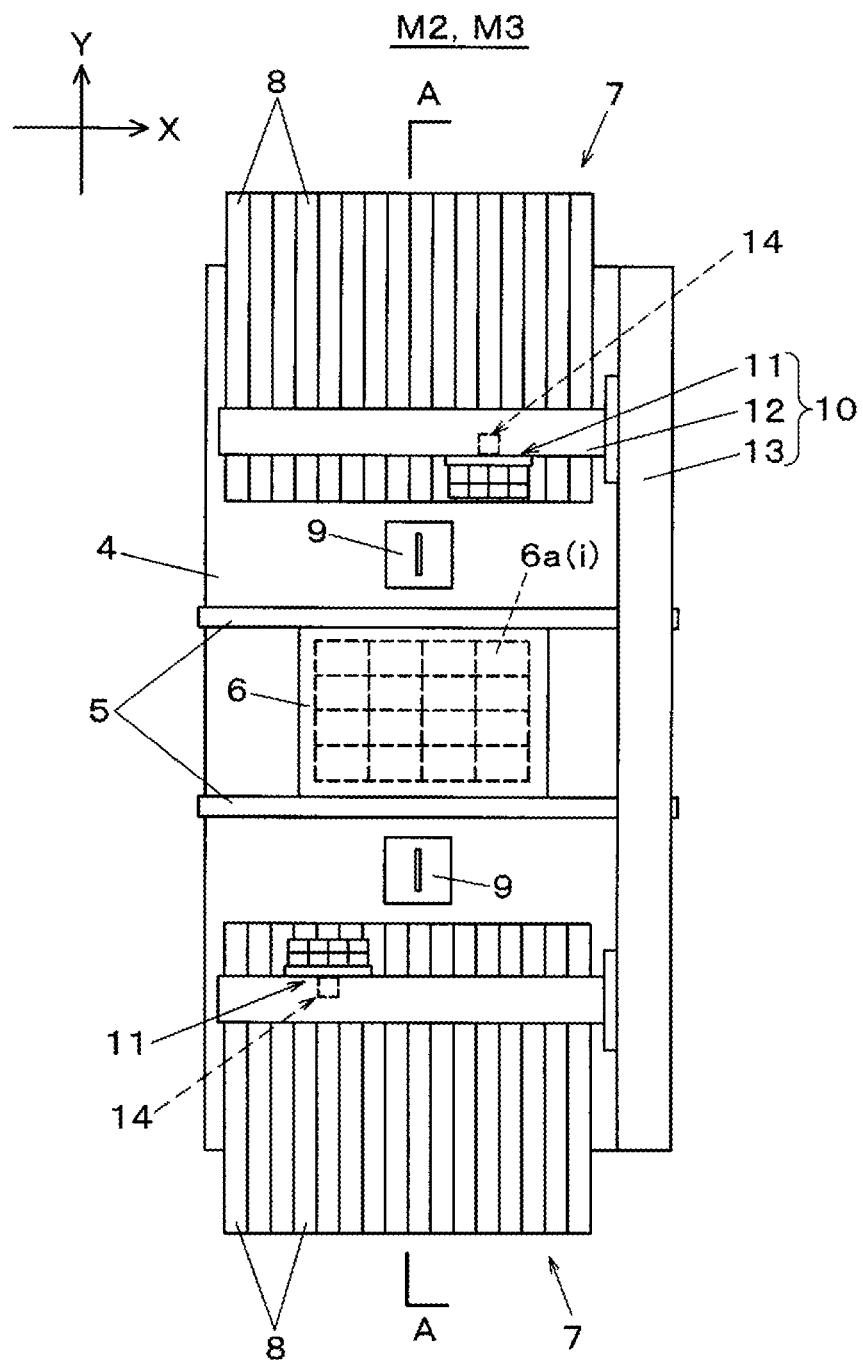
FIG. 2 is a plan view illustrating a configuration of a component mounting device that is used in the component mounting system according to the exemplary embodiment of the present disclosure.
Figure 3:
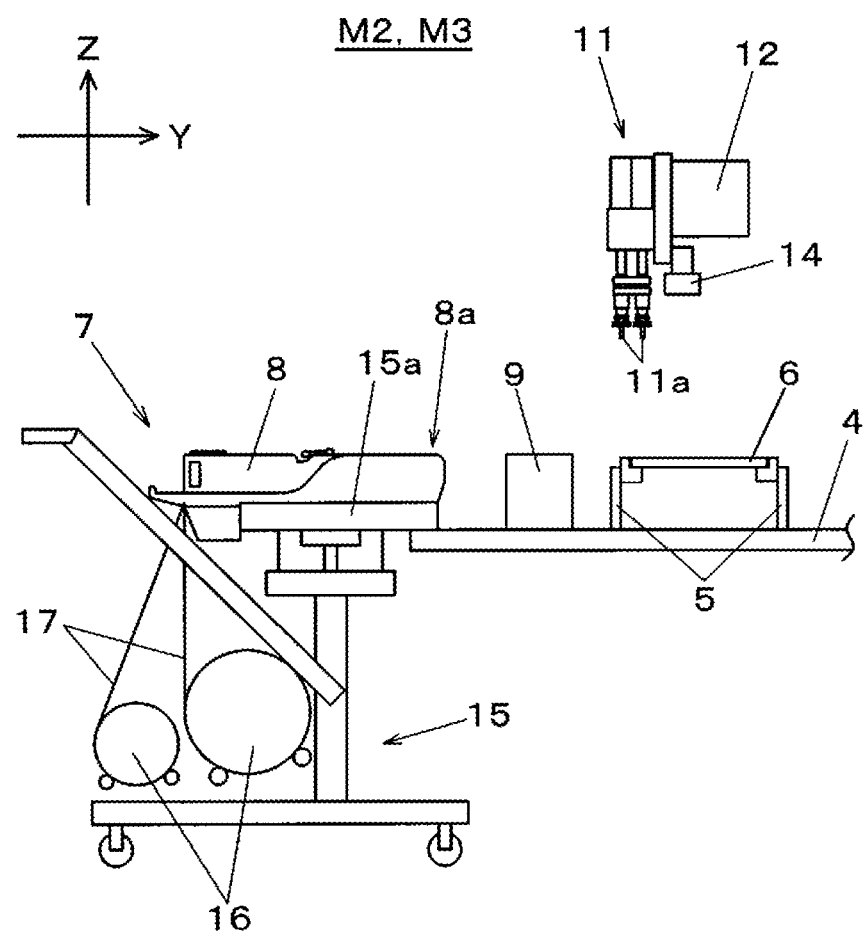
FIG. 3 is a partial sectional view of the component mounting device that is used in the component mounting system according to the exemplary embodiment of the present disclosure.

Hereinafter, configurations of component mounting devices M2 and M3 will be described with reference to FIGS. 2 and 3. FIG. 3 is an illustration of an A-A cross section in FIG. 2. As illustrated in FIG. 2, board transport mechanism 5 is provided in an X direction (board transport direction) at a center of an upper surface of base 4, and board transport mechanism 5 transports board 6 delivered from an upstream side device and places and holds board 6 at a position of a mounting work by component mounting unit 10 (described later). In the present exemplary embodiment, mounting regions 6a(i) are set on board 6 with a mounting range of the board divided into the grid-shaped cell regions. During the above-described evaluation value calculation, the evaluation value can be individually calculated for each mounting region 6a identified based on index (i).

Component supply units 7 are placed on both sides of board transport mechanism 5 and a plurality of tape feeders 8 are juxtaposed in component supply units 7. Tape feeder 8 supplies the component to a position of component suctioning by a mounting head of the component mounting unit by pitch-feeding a carrier tape holding the component that is a mounting target. Y-axis beam 13 is provided in a Y direction, which is orthogonal to the X direction, in one X-direction end portion of the upper surface of base 4 and two X-axis beams 12 are coupled with each other, to be capable of moving in the Y direction, in Y-axis beam 13.

Mounting head 11 is installed, to be capable of moving in the X direction, in each of two X-axis beams 12. Mounting head 11 is a multiple-type head that has a plurality of holding heads 11b (refer to FIG. 4) and suction nozzle 11a is installed in a lower end portion of each of holding heads 11b as illustrated in FIG. 3, suction nozzles 11a being capable of suctioning and holding an electronic component and capable of individual lifting and lowering.

Mounting heads 11 are moved in the X direction and the Y direction by Y-axis beam 13 and X-axis beam 12 being driven. Then, each of two mounting heads 11 suctions, holds, and takes out the component, by using suction nozzles 11a, from the component suction position of tape feeder 8 of corresponding component supply unit 7 and transfers and places the component to and at a mounting point on board 6 positioned in board transport mechanism 5. Y-axis beam 13, X-axis beam 12, and mounting head 11 constitute component mounting unit 10 that mounts the component on board 6.

Component recognition camera 9 is provided between component supply unit 7 and board transport mechanism 5. When mounting head 11 moves above component recognition camera 9 after taking out the component from component supply unit 7, component recognition camera 9 images and recognizes the component in a state of being held by mounting head 11. Board recognition cameras 14, which are positioned on lower surface sides of X-axis beams 12 and moving integrally with respective mounting heads 11, are installed on mounting heads 11. As mounting head 11 moves, board recognition camera 14 moves above board 6 positioned in board transport mechanism 5 and images and recognizes board 6. During an operation in which the component is mounted on board 6 by mounting head 11, a placement position correction is performed in view of a result of the component recognition by component recognition camera 9 and a result of the board recognition by board recognition camera 14.

As illustrated in FIG. 3, carriage 15 is set in component supply unit 7, carriage 15 being in a state where the plurality of tape feeders 8 are installed in advance on feeder base 15a. Feeder addresses for identifying feeder positions where individual tape feeders 8 are installed are set in feeder base 15a. Individual tape feeders 8(i) set on feeder base 15a are identified via these feeder addresses. Supply reel 16 is held in carriage 15 installed in component supply unit 7 and supply reel 16 houses component-housing carrier tape 17 in a state where carrier tape 17 is wound. Carrier tape 17 pulled out from supply reel 16 is pitch-fed by tape feeder 8 up to a position of the component suctioning by suction nozzle 11a.

Figure 4:
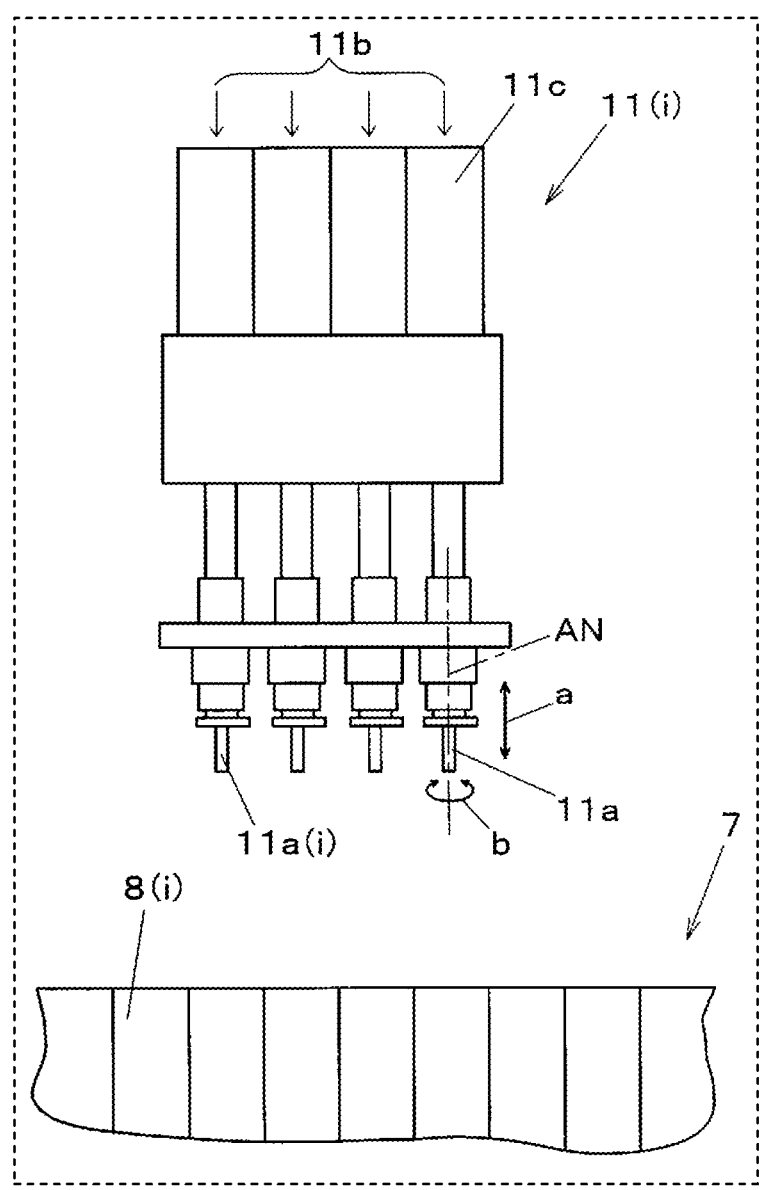
FIG. 4 is an explanatory diagram illustrating configurations of a mounting head and a component supply unit of the component mounting device that is used in the component mounting system according to the exemplary embodiment of the present disclosure.

As illustrated in FIG. 4, mounting head 11 is the multiple-type head that has the plurality of holding heads 11b and each of holding heads 11b has driving mechanism 11c. By driving mechanism 11c being driven, suction nozzle 11a installed in the lower end portion of each holding head 11b can be lifted and lowered (arrow a) and suction nozzle 11a is allowed to rotate about nozzle axis AN (arrow b).

During the component mounting work by component mounting unit 10, a unit work is repeatedly executed in which the component is transferred to and placed on board 6 after being taken out from tape feeder 8 installed in component supply unit 7 by suction nozzle 11a of mounting head 11. Identified for each individual unit work during this component mounting work are mounting region 6a(i) in board 6 (refer to FIG. 2), tape feeder 8(i) in component supply unit 7, mounting head 11(i) of component mounting devices M2 and M3 in component mounting system 1, and suction nozzle 11a(i) of mounting head 11.

Regarding the board inspection information showing an inspection result derived from a post-mounting inspection that is executed by inspection device M4, the inspection result is individually associated with mounting region 6a(i), tape feeder 8(i), mounting head 11(i), and suction nozzle 11a(i) individually identified based on index (i). Accordingly, the evaluation value representing the accuracy at the time of the mounting by component mounting unit 10 can be obtained for each evaluation target of mounting region 6a(i), tape feeder 8(i), mounting head 11(i), and suction nozzle 11a(i).

Figure 5:
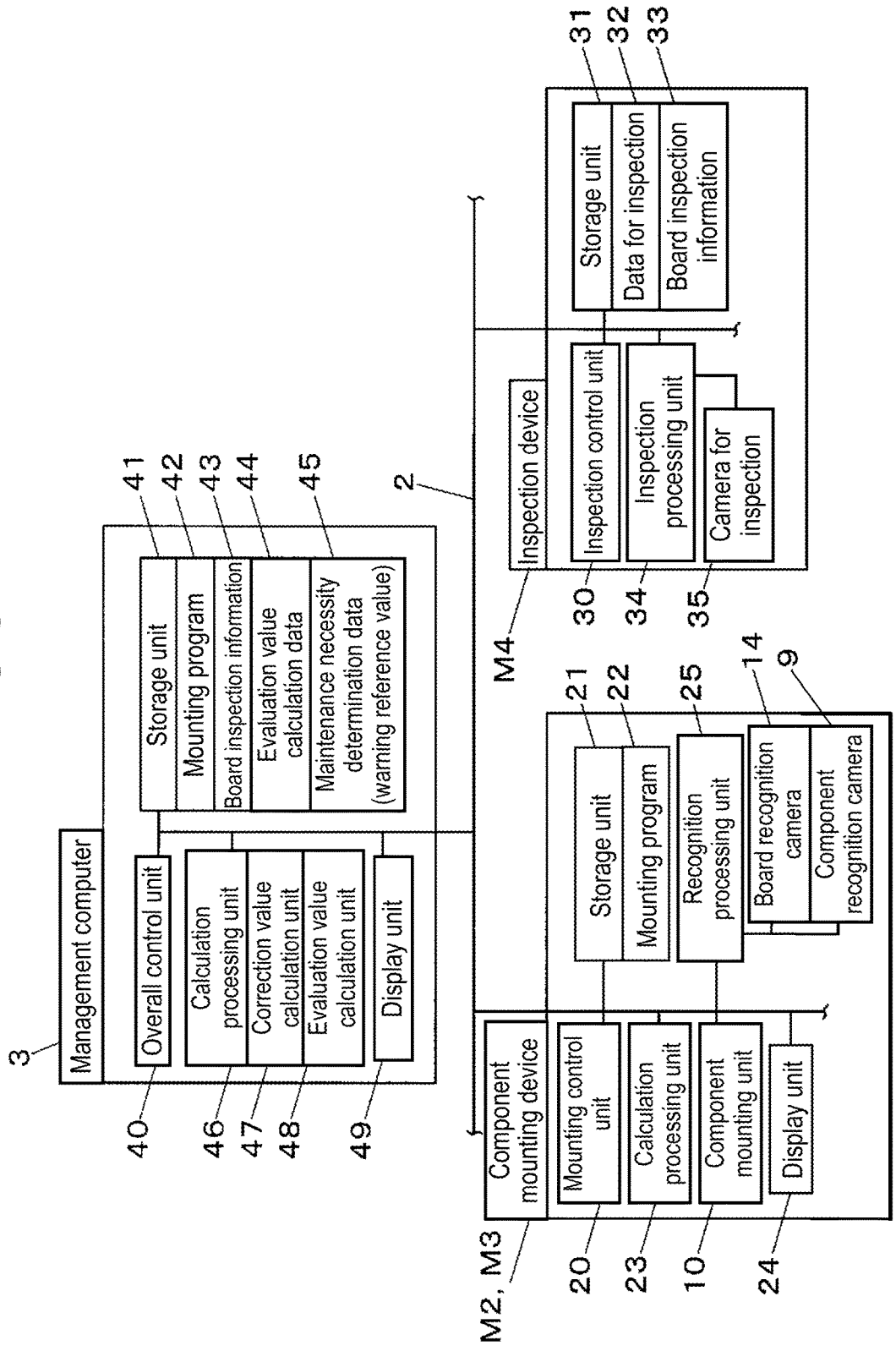
FIG. 5 is a block diagram illustrating a configuration of a control system for the component mounting system according to the exemplary embodiment of the present disclosure.

A configuration of a control system will be described below with reference to FIG. 5. As illustrated in FIG. 5, management computer 3, component mounting devices M2 and M3, and inspection device M4 are connected via communication network 2. Component mounting devices M2 and M3 have mounting control unit 20, storage unit 21, calculation processing unit 23, display unit 24, and recognition processing unit 25. Mounting control unit 20 controls each of the following units based on a program and data stored in storage unit 21. Mounting program 22 for the execution of the component mounting work described above is stored in storage unit 21, and the component mounting work is executed by mounting control unit 20 controlling component mounting unit 10 (refer to FIG. 1) based on mounting program 22.

Calculation processing unit 23, which is a calculation function of component mounting devices M2 and M3, executes calculation processing such as correction value calculation processing (described later) and evaluation value calculation processing (described later) if necessary. In a case where the calculation processing is executed by calculation processing unit 46 of management computer 3, the function of calculation processing unit 23 is unnecessary. Display unit 24, which is a display device such as a liquid crystal panel, displays, for example, a result of the calculation executed by calculation processing unit 23 if necessary.

Recognition processing unit 25 recognizes and processes results of the imaging by board recognition camera 14 and component recognition camera 9. A position of board 6 is detected by the recognition processing of the result of the imaging by board recognition camera 14 and a position of the component in the state of being held by mounting head 11 is detected by the recognition processing of the result of the imaging by component recognition camera 9. During the component mounting work by component mounting unit 10, mounting control unit 20 controls component mounting unit 10 in view of these position detection results.

Inspection device M4 has inspection control unit 30, storage unit 31, and inspection processing unit 34, and inspection processing unit 34 performs predetermined inspection processing based on a result of imaging by camera 35 for inspection (not illustrated). Inspection control unit 30 controls each of the following units based on a program and data stored in storage unit 31. Data 32 for inspection for the execution of the above-described inspection processing is stored in storage unit 31, and a result of the inspection by inspection processing unit 34 is stored in storage unit 31 as board inspection information 33.

Figure 6:
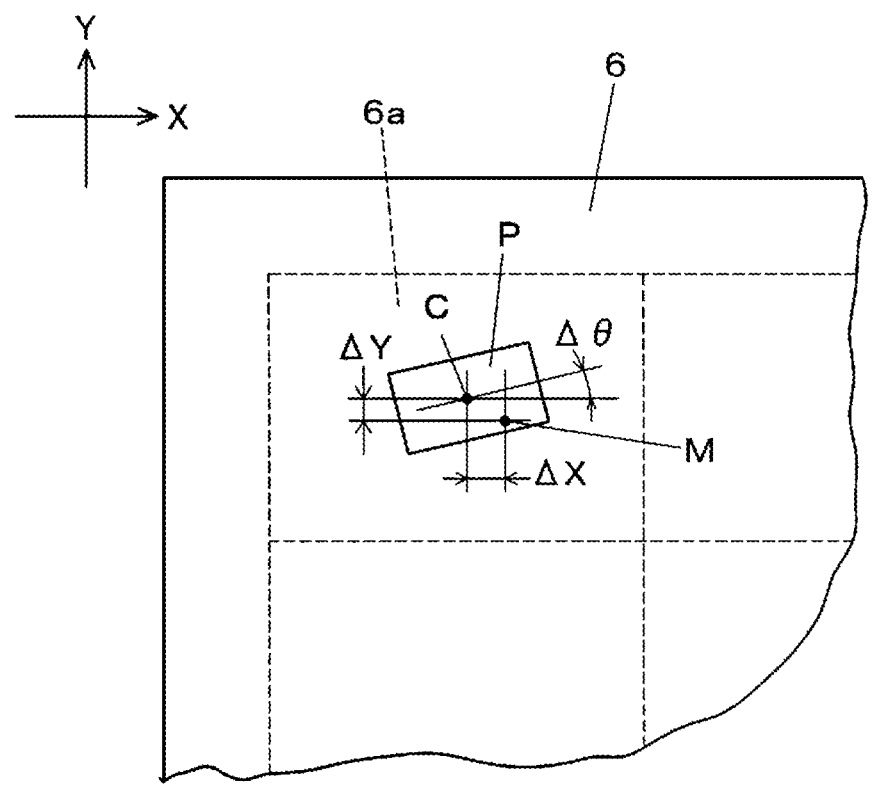
FIG. 6 is an explanatory diagram of a post-mounting inspection in the component mounting system according to the exemplary embodiment of the present disclosure.

Hereinafter, the post-mounting inspection that is executed on board 6 after the component mounting as a target and the board inspection information that shows the inspection result will be described with reference to FIG. 6. During the component mounting work, component P taken out from tape feeder 8 of component supply unit 7 by suction nozzle 11a of mounting head 11 is subjected to transfer to and placement at mounting point M set on board 6 as a target position. At this time, component center C of component P does not necessarily correspond exactly to mounting point M and a state arises where component center C is subjected to a position deviation of $\Delta X$ in the X direction, $\Delta Y$ in the Y direction, and $\Delta \theta$ in a $\theta$ direction (direction of rotation in an XY plane).

In this position deviation state, a result of imaging of component P mounted on board 6, this imaging being performed by camera 35 for inspection, is acquired by the result being recognized and processed by inspection processing unit 34. $\Delta X$, $\Delta Y$, and $\Delta \theta$ are position deviation information regarding component P, and the board inspection information regarding board 6 is created by the position deviation information regarding every component P mounted on single board 6 being collected. The board inspection information regarding a plurality of boards 6 as targets is included in board inspection information 33 of storage unit 31. In other words, board inspection information 33 has the form of board inspection information that includes at least the position deviation information regarding the component mounted on board 6.

In the present exemplary embodiment, the position deviation information constituting the board inspection information is individually associated with mounting region 6a(i) to which mounting point M as a mounting position belongs, tape feeder 8(i) from which target component P is taken out, mounting head 11(i) performing the mounting operation, and suction nozzle 11a(i). Accordingly, the inspection result derived from the post-mounting inspection executed with regard to the component mounting work executed by component mounting devices M2 and M3 can become evaluation targets after classification by mounting position, individual tape feeder 8, mounting head 11, and suction nozzle 11a. Then, these pieces of board inspection information 33 are transmitted to management computer 3 via communication network 2.

Management computer 3 has overall control unit 40, storage unit 41, calculation processing unit 46, and display unit 49. Overall control unit 40 controls each of the following units based on a program and data stored in storage unit 41. Then, a work operation and calculation processing by each device constituting component mounting system 1 are executed. Mounting program 42, board inspection information 43, evaluation value calculation data 44, and maintenance necessity determination data 45 are stored in storage unit 41 and calculation processing unit 46 has correction value calculation unit 47 and evaluation value calculation unit 48. Display unit 49, which is a display device such as a liquid crystal panel, displays display screens such as those illustrated in FIGS. 8 and 9.

Mounting program 42, which includes information such as an operation program and mounting coordinate data for the execution of the component mounting work, is sent to management computer 3 from another device such as a host system and then transmitted to component mounting devices M2 and M3 via communication network 2. Board inspection information 43 is data obtained by board inspection information 33 acquired by inspection device M4 being transmitted to management computer 3 via communication network 2. Evaluation value calculation data 44 is data that is referred to during the evaluation value calculation processing by evaluation value calculation unit 48 (described later). Maintenance necessity determination data 45 is data (warning reference value) with which the necessity of facility maintenance is determined based on "pre-correction evaluation value" 53b (refer to FIG. 8) calculated by evaluation value calculation unit 48.

Correction value calculation unit 47 performs processing for calculating a correction value for correcting mounting program 42 based on board inspection information 43 including at least position deviation information regarding the component mounted on board 6. In other words, 100% or a pre-defined predetermined ratio of position deviation amounts ΔX, ΔY, and Δθ illustrated in FIG. 6 is calculated as a correction amount. In addition, correction value calculation unit 47 performs correction processing for correcting mounting program 42 based on the calculated correction value. During this correction processing, correction value calculation unit 47 calculates the correction value based on a plurality of pieces of board inspection information 43 over a predetermined period of time including most recent board inspection information 43. For example, correction value calculation unit 47 accumulates board inspection information 43 with regard to the number of the boards set in advance as the number of data acquisition targets for the correction value calculation and calculates the correction value for the correction of mounting program 42 by using, for example, an average value obtained by statistical processing of the accumulated board inspection information 43.

Then, mounting program 42 corrected as described above is sent to component mounting devices M2 and M3 via communication network 2 and is stored in storage unit 21 as mounting program 22 for operation execution. When the component mounting is performed by component mounting unit 10 being controlled by mounting control unit 20, the component is mounted on board 6 in accordance with corrected mounting program 22. Evaluation value calculation data 44 is data that is used for the evaluation value to be calculated by evaluation value calculation unit 48.

Evaluation value calculation unit 48 performs processing for calculating the evaluation value, which represents the accuracy at the time of the mounting by component mounting unit 10, based on board inspection information 43 stored in storage unit 41. During this evaluation value calculation processing, evaluation value calculation data 44 stored in storage unit 41 is referred to. Herein, process capability indices Cp and Cpk to be described below are used as the evaluation value. Process capability indices Cp and Cpk, which are calculated based on board inspection information 43, will be described below with reference to FIGS. 7A and 7B.

Figure 7A:
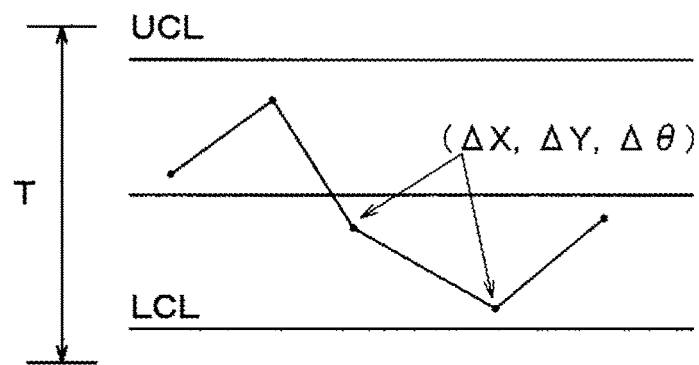
FIG. 7A is an explanatory diagram of a process capability index that is calculated in the component mounting system according to the exemplary embodiment of the present disclosure.

Standard width T illustrated in FIG. 7A, which defines an allowable position deviation amount that allows the mounted component to be subjected to normal solder bonding, is empirically determined based on evaluation of a result of an experiment in which the component is actually bonded. Allowable range upper limit UCL and allowable range lower limit LCL define an upper limit and a lower limit of an allowable range of the position deviation amount. Herein, ±3σ, which are ±3 times standard deviation a obtained by statistical processing of bonding characteristics of the target component, that is, the position deviation amount obtained after the component is bonded predetermined number of times, are adopted as allowable range upper limit UCL and allowable range lower limit LCL.

Figure 7B:
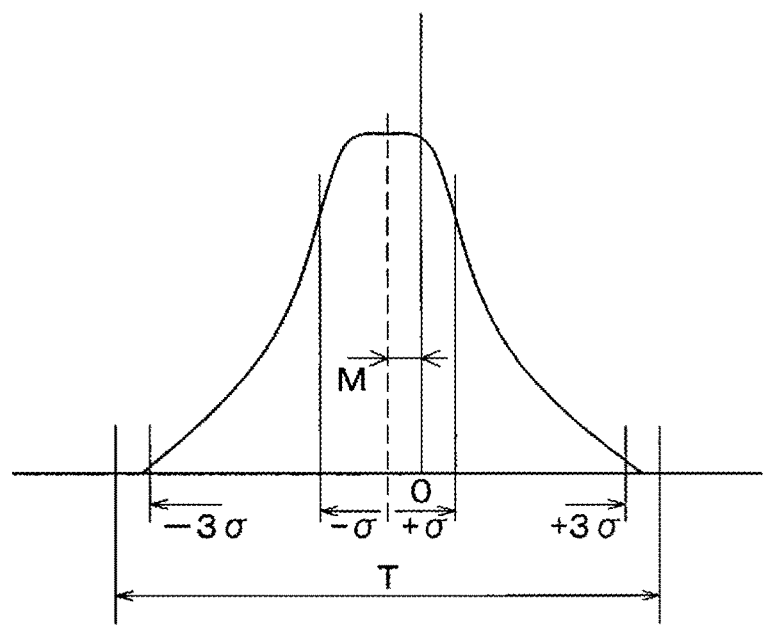
FIG. 7B is an explanatory diagram of the process capability index that is calculated in the component mounting system according to the exemplary embodiment of the present disclosure.

FIG. 7B illustrates various statistical amounts calculated based on board inspection information 43. First of all, data values indicating position deviation amounts ΔX, ΔY, and Δθ are subjected to individual statistical processing, and then data value average (M) and standard deviation σ indicating a degree of data value variation are obtained for each. Then, $Cp = T/6\sigma$ shown in Equation (1) is obtained based on given standard width T and calculated standard deviation σ. Subsequently, deviation value $k=|M|/(T/2)$ shown in Equation (2) is obtained, and process capability index $Cpk=(1-k)\cdot Cp$ shown in Equation (3) is calculated by obtained k and Cp being used. This process capability index Cpk is calculated for each of position deviation amounts ΔX, ΔY, and Δθ.

Figure 8:
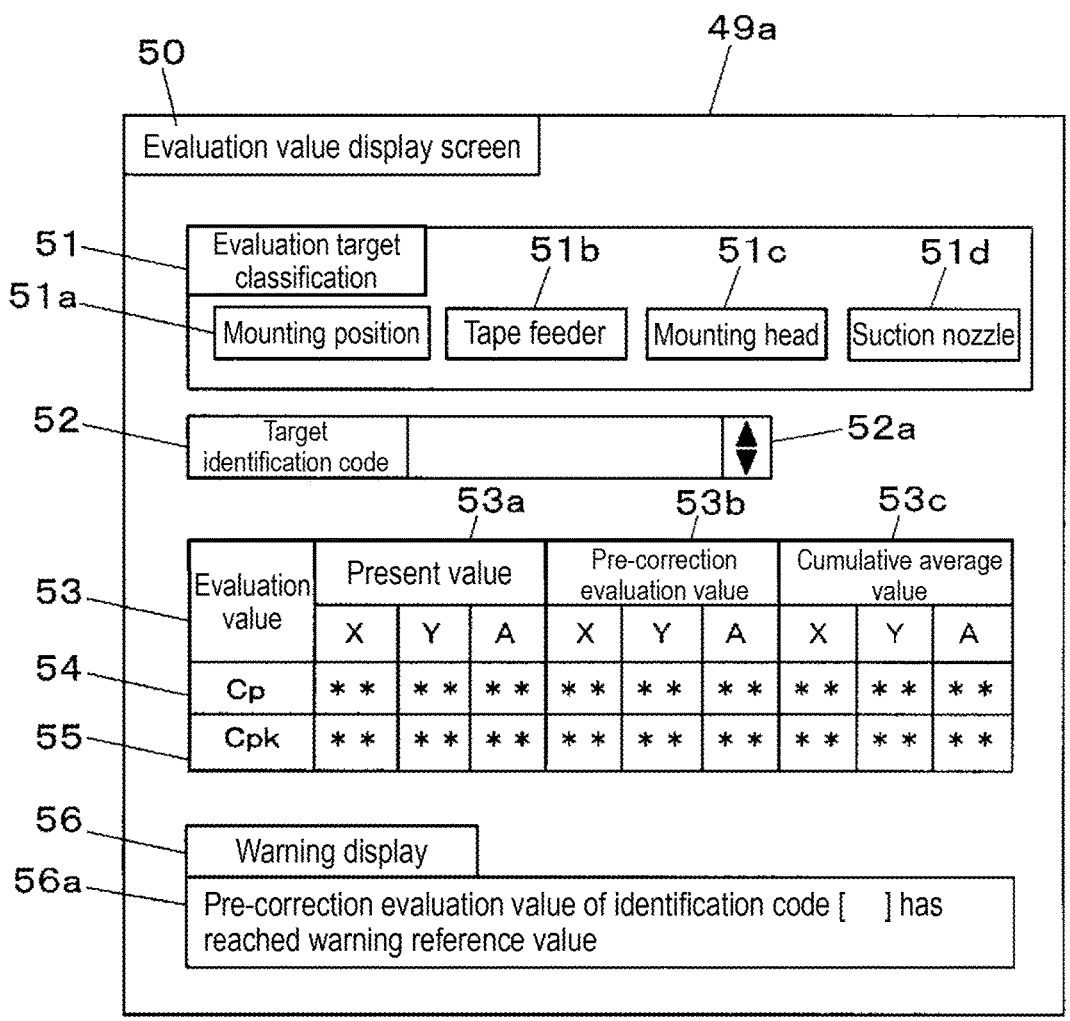
FIG. 8 is an explanatory diagram illustrating an evaluation value display screen regarding a component mounting method according to an exemplary embodiment of the present disclosure.
Figure 9:
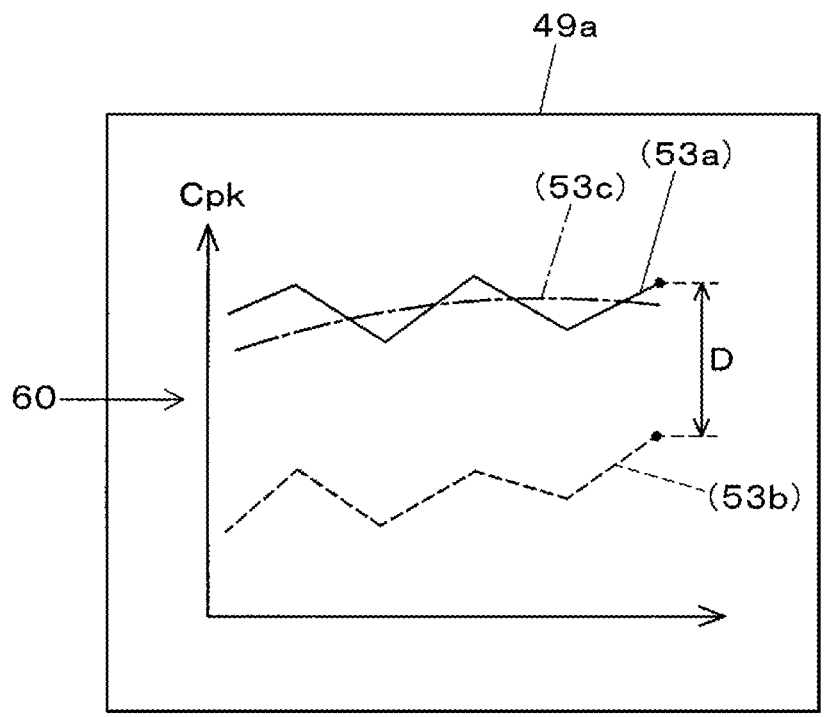
FIG. 9 is a graph illustrating fluctuations of a present value and a pre-correction trial calculation value of an evaluation value regarding the component mounting method according to the exemplary embodiment of the present disclosure.

During the calculation of process capability indices Cp and Cpk as the evaluation value according to the present exemplary embodiment, not only a specific-point-in-time evaluation value (present value process capability index) calculated retroactively from a specific point in time (most recent point in time herein) based on board inspection information 43 targeting a predetermined number of the boards but also a pre-correction trial calculation value (pre-correction trial process capability index) indicating the evaluation value pertaining to a case where it is assumed that no correction has been performed on the board and a cumulative average value indicating a cumulative average value of process capability index Cpk are calculated on a time-series basis and these are displayed on the glanceable display screen (refer to FIG. 8) and in a glanceable graph (refer to FIG. 9). This display processing is performed by display unit 49, and display unit 49 displays the evaluation values calculated by evaluation value calculation unit 48, the specific-point-in-time evaluation value and the pre-correction evaluation value to be more specific.

Evaluation value display screen 50 that is displayed on display screen 49a of display unit 49 will be described with reference to FIG. 8. Evaluation target classification selection column 51, evaluation identification code display column 52, evaluation value display column 53, and warning display column 56 are displayed on evaluation value display screen 50. Evaluation target classification selection column 51 shows a classification of the evaluation targets for which the evaluation values are calculated. In the present exemplary embodiment, the evaluation value representing the accuracy at the time of the mounting by component mounting unit 10 can be calculated based on the classification by mounting region 6a, tape feeder 8, mounting head 11, and suction nozzle 11a as described above.

Operation buttons for selecting "mounting position" 51a, "tape feeder" 51b, "mounting head" 51c, and "suction nozzle" 51d in response to the above-described classification are set in evaluation target classification selection column 51. The evaluation targets can be selected and switched when these operation buttons are operated. In addition, a target identification code is displayed in evaluation identification code display column 52 when scroll button 52a of evaluation identification code display column 52 is operated, the target identification code identifying, in the classification selected in evaluation target classification selection column 51, an element that has an evaluation value to be displayed in evaluation value display column 53 as an evaluation target (mounting region 6a, tape feeder 8, mounting head 11, or suction nozzle 11a).

In evaluation value display column 53, two types of evaluation values (process capability indices Cp and Cpk) regarding the evaluation target identified by evaluation target classification selection column 51 and evaluation identification code display column 52 are displayed in Cp display column 54 and Cpk display column 55, respectively. Herein, "present value" 53a (corresponding to the specific-point-in-time evaluation value), "pre-correction evaluation value" 53b, and "cumulative average value" 53c are displayed for each of position deviation directions X, Y, and A (θ rotation direction) with regard to any one of process capability indices Cp and Cpk. The calculation of these evaluation values is performed by evaluation value calculation unit 48.

In other words, evaluation value calculation unit 48 calculates the specific-point-in-time evaluation value ("present value" 53a), which is an evaluation value calculated based on board inspection information 43 at the specific point in time (most recent point in time), and pre-correction evaluation value 53b as the evaluation values representing the accuracy at the time of the mounting by component mounting unit 10. Pre-correction evaluation value 53b is an evaluation value calculated based on information obtained by the correction value used when component mounting unit 10 mounts the component on board 6 as a target of board inspection information 43 at the specific point in time being subtracted from board inspection information 43 at the specific point in time, that is, the position deviation information pertaining to a case where it is assumed that correction based on the inspection result obtained as a result of the post-mounting inspection executed by inspection device M4 has not been performed.

More specifically, evaluation value calculation unit 48 calculates the pre-correction evaluation value based on a temporary position deviation amount that is obtained from the position deviation amounts in the XYθ directions regarding the component obtained from most recent board inspection information 43 and the correction amounts in the XYθ directions regarding the component obtained from the correction value calculated by correction value calculation unit 47. Herein, the temporary position deviation amount means a position deviation amount that is assumed in a case where correction based on the correction value calculated by correction value calculation unit 47 has not been performed. Although three directions, that is, the X direction, the Y direction, and the θ direction, are described as the correction target position deviation directions in the above description, all these three directions do not necessarily have to be included in the targets and only two directions, one being the X direction and the other one being the Y direction, may be regarded as the targets.

FIG. 9 shows an example of evaluation value graph 60 in which "present value" 53a, "pre-correction evaluation value" 53b, and "cumulative average value" 53c calculated as described above are displayed in the form of graphs. In other words, a time-dependent change in process capability index Cpk obtained with regard to the position deviation amount in any one of the X direction, the Y direction, and the θ direction is graph-displayed in evaluation value graph 60 illustrated as an example in FIG. 9 in the form of polygonal lines (53a), (53b), and (53c). In this graph, polygonal lines (53a), (53b), and (53c) correspond to "present value" 53a, "pre-correction evaluation value" 53b, and "cumulative average value" 53c, respectively.

Level difference D, which indicates a difference between polygonal line (53a) and polygonal line (53b), indicates an effect of the correction of mounting program 42 fed back based on the inspection result derived from the post-mounting inspection by inspection device M4. In other words, even in a case where it is determined that no problem has been posed in terms of mounting quality with "present value" 53a being at a high level in evaluation value graph 60, a position deviation state-exacerbating facility failure being present in component mounting devices M2 and M3 is indicated in a case where the level difference D is large with respect to polygonal line (53b) showing "pre-correction evaluation value" 53b.

Evaluation value display screen 50 illustrated in FIG. 8 is configured to include warning display column 56 so that a worker is notified of the presence of the facility failure. Display message 56a is displayed in warning display column 56 and, in a case where "pre-correction evaluation value" 53b displayed in evaluation value display column 53 has reached the warning reference value defined by maintenance necessity determination data 45 stored in advance in storage unit 41, display message 56a urges the worker to perform maintenance on that element by providing a notice to that effect for the worker.

In other words, display unit 49 performs display for urging the worker to perform maintenance on component mounting unit 10 in a case where "pre-correction evaluation value" 53b has reached the predetermined warning reference value. Then, whether or not a facility state is a state of failure that is so significant as to require maintenance can be accurately grasped even in a case where correction of mounting program 42 in accordance with feedback based on the inspection result derived from the post-mounting inspection by inspection device M4 has been performed and a facility state failure in component mounting devices M2 and M3 is not conspicuous.

According to a method for component mounting by component mounting system 1, the correction value for correcting mounting program 42 is calculated based on board inspection information 43 including at least the position deviation information regarding component P mounted on board 6 and component P is mounted on board 6 in accordance with mounting program 42 corrected based on the calculated correction value as described above. During this component mounting work, the evaluation value representing the accuracy at the time of the mounting is calculated based on board inspection information 43 by correction value calculation unit 47 and the calculated evaluation value is displayed by display unit 49.

The evaluation value calculated as described above is divided into the specific-point-in-time evaluation value ("present value" 53a), which is an evaluation value calculated based on board inspection information 43 at the specific point in time, and pre-correction evaluation value 53b, which is calculated based on the information obtained by the correction value used when the mounting is performed on board 6 as the target of board inspection information 43 at the specific point in time being subtracted from board inspection information 43 at the specific point in time, and display unit 49 displays the specific-point-in-time evaluation value ("present value" 53a) and "pre-correction evaluation value" 53b. In this manner, the effect of the correction based on the feedback of the inspection result derived from the post-mounting inspection executed by inspection device M4 can be clearly grasped and a situation of the facility failure in component mounting devices M2 and M3 or the like can be confirmed.

Although an example in which the correction value calculation processing and the evaluation value calculation processing are executed by calculation processing unit 46, which is the calculation function of management computer 3, has been described in the exemplary embodiment described above, the correction value calculation processing and the evaluation value calculation processing may be executed by calculation processing unit 23 of component mounting devices M2 and M3 in a case where component mounting devices M2 and M3 have calculation processing unit 23 that has a similar calculation processing function. In this case, the display screens illustrated in FIGS. 8 and 9 are displayed by display unit 24 of component mounting devices M2 and M3.

With the component mounting system and by the component mounting method according to the present disclosure, an inspection result feedback-based correction effect can be clarified and a facility failure situation can be confirmed and, as such, the component mounting system and the component mounting method according to the present disclosure are effective in the field of component mounting in which component mounting is performed on boards.

What is claimed is:

1. A component mounting system comprising:
   a correction value calculation unit calculating a correction value for correcting a mounting program based on board inspection information including at least position deviation information regarding a component mounted on a board;
   a component mounting unit mounting the component on the board in accordance with the mounting program corrected based on the correction value calculated by the correction value calculation unit;
   an evaluation value calculation unit calculating evaluation values based on the board inspection information, the evaluation values representing accuracy at a time of the mounting by the component mounting unit; and
   a display unit displaying the evaluation values calculated by the evaluation value calculation unit,
   wherein the evaluation value calculation unit calculates a specific-point-in-time evaluation value and a pre-correction evaluation value as the evaluation values, the specific-point-in-time evaluation value being an evaluation value calculated based on the board inspection information at a specific point in time and the pre-correction evaluation value being calculated based on information obtained by the correction value used during the mounting by the component mounting unit on the board as a target of the board inspection information at the specific point in time being subtracted from the board inspection information at the specific point in time, and
   wherein the display unit displays the specific-point-in-time evaluation value and the pre-correction evaluation value.

2. The component mounting system of claim 1,
   wherein the correction value calculation unit calculates the correction value based on a plurality of pieces of the board inspection information over a predetermined period of time including a most recent piece of the board inspection information.

3. The component mounting system of claim 1,
   wherein the evaluation value calculation unit calculates the pre-correction evaluation value based on a temporary position deviation amount pertaining to a case of no correction based on the correction value obtained from XY-direction position deviation amounts regarding the component obtained from the most recent board inspection information and XY-direction correction amounts regarding the component obtained from the correction value.

4. The component mounting system of claim 1,
   wherein the evaluation values are calculated for each mounting position of the board.

5. The component mounting system of claim 1,
   wherein the evaluation values are calculated for each mounting head on which the board is mounted.

6. The component mounting system of claim 1,
   wherein the display unit performs display with respect to a worker in a case where the pre-correction evaluation value has reached a predetermined warning reference value, the display being to urge the worker to perform maintenance on the component mounting unit.

7. A component mounting method comprising:
   calculating a correction value for correcting a mounting program based on board inspection information including at least position deviation information regarding a component mounted on a board;
   mounting the component on the board in accordance with the mounting program corrected based on the calculated correction value;
   calculating evaluation values based on the board inspection information, the evaluation values representing accuracy at a time of the mounting; and
   displaying the calculated evaluation values,
   wherein the evaluation values are a specific-point-in-time evaluation value and a pre-correction evaluation value, the specific-point-in-time evaluation value being an evaluation value calculated based on the board inspection information at a specific point in time and the pre-correction evaluation value being calculated based on information obtained by the correction value used during the mounting on the board as a target of the board inspection information at the specific point in time being subtracted from the board inspection information at the specific point in time, and
   wherein the specific-point-in-time evaluation value and the pre-correction evaluation value are displayed.

* * * * *